United States Patent
Reid et al.

(10) Patent No.: US 8,559,668 B2
(45) Date of Patent: Oct. 15, 2013

(54) RED-EYE REDUCTION USING FACIAL DETECTION

(75) Inventors: Russell Reid, Palo Alto, CA (US); Joshua Fagans, Redwood City, CA (US); Tim Cherna, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1171 days.

(21) Appl. No.: 12/476,192

(22) Filed: Jun. 1, 2009

(65) Prior Publication Data

US 2010/0303345 A1    Dec. 2, 2010

(51) Int. Cl.
*G06K 9/00* (2006.01)
*G06K 9/40* (2006.01)

(52) U.S. Cl.
USPC ............ 382/100; 382/117; 382/274; 382/275

(58) Field of Classification Search
None
See application file for complete search history.

(56) References Cited

U.S. PATENT DOCUMENTS

| | | | |
|---|---|---|---|
| 6,728,401 B1 | 4/2004 | Hardeberg | |
| 7,116,820 B2 * | 10/2006 | Luo et al. | 382/167 |
| 7,343,028 B2 * | 3/2008 | Ioffe et al. | 382/118 |
| 7,627,146 B2 * | 12/2009 | Thakur | 382/117 |
| 7,684,642 B2 * | 3/2010 | Gallagher et al. | 382/275 |
| 7,724,950 B2 * | 5/2010 | Umeda | 382/167 |
| 7,831,067 B2 * | 11/2010 | Le Shiffer et al. | 382/117 |
| 7,852,377 B2 * | 12/2010 | Wu | 348/222.1 |
| 7,853,048 B2 * | 12/2010 | Kakiuchi | 382/117 |
| 7,907,786 B2 * | 3/2011 | Fan et al. | 382/254 |
| 7,995,239 B2 * | 8/2011 | Yonaha | 358/1.9 |
| 2004/0228542 A1 * | 11/2004 | Zhang et al. | 382/275 |
| 2005/0117173 A1 * | 6/2005 | Kugo | 358/1.1 |
| 2005/0169520 A1 * | 8/2005 | Chen et al. | 382/165 |
| 2005/0196067 A1 * | 9/2005 | Gallagher et al. | 382/275 |
| 2005/0232481 A1 * | 10/2005 | Wu | 382/167 |
| 2005/0243348 A1 * | 11/2005 | Yonaha | 358/1.9 |
| 2006/0257132 A1 * | 11/2006 | Shiffer et al. | 396/158 |
| 2006/0274950 A1 * | 12/2006 | Fan et al. | 382/228 |
| 2007/0065006 A1 | 3/2007 | Wilensky | |
| 2008/0095445 A1 | 4/2008 | Brandt | |
| 2009/0067682 A1 * | 3/2009 | Ohk et al. | 382/118 |
| 2009/0103784 A1 * | 4/2009 | Forutanpour | 382/117 |
| 2010/0066822 A1 * | 3/2010 | Steinberg et al. | 348/77 |
| 2010/0302272 A1 | 12/2010 | Reid et al. | |

FOREIGN PATENT DOCUMENTS

WO    WO 2006011635 A1 *    2/2006

* cited by examiner

*Primary Examiner* — David Zarka
*Assistant Examiner* — Avinash J Yentrapati
(74) *Attorney, Agent, or Firm* — Wong, Cabello, Lutsch, Rutherford & Brucculeri LLP

(57) ABSTRACT

A computer-implemented method for detecting a red-eye artifact that includes receiving an image depicting a first eye and a second eye corresponding to a human face, and coordinates corresponding to a location of the first eye and the second eye in the image; calculating a distance between the first eye and the second eye using the received coordinates; obtaining a skin tone sample from the image based on the calculated distance and the received coordinates; generating a skin tone color region in a color space based on the obtained skin tone sample; classifying a pixel corresponding to the first eye as a red-eye pixel by comparing the pixel with the generated skin tone color region and a predetermined red-eye color region; and storing an indication of the classifying relative to the pixel.

17 Claims, 5 Drawing Sheets

RED-EYE REDUCTION USING FACIAL DETECTION

TECHNICAL FIELD

The present disclosure relates to red-eye recognition and reduction, such as in images captured by flash photography.

BACKGROUND

Red-eye artifacts often occur in photography. The occurrence of red-eye artifacts is referred to as "red-eye." Red-eye artifacts are caused by light entering a subject's eye through the pupil, reflecting off the retina at the back of the eye, and traveling back through the pupil toward the camera lens. The light can originate from a flash used to improve lighting conditions for capturing an image. Red-eye artifacts often appear red- or orange-colored in the captured image. The red or orange color results from the retina absorbing, rather than reflecting, non-reddish components of the light entering the eye. The color that is reflected in a red-eye artifact is determined by the color of the fundus of the eye along with the color of the illuminant (i.e., the light illuminating an image subject). Because the color of the fundus varies from one individual to another, and the color of illuminants varies depending on ambient light, flash equipment, and reflections, the precise color associated with red-eye artifacts can vary substantially across photographs.

Techniques can be used to reduce the occurrence of red-eye artifacts at the time a photograph is taken. For example, the lateral distance between a flash and the lens can be increased. Although light is still reflected by the retina, less light is reflected toward the camera. In addition, pre-flashes can be used to reduce the size of the subject's pupils. Techniques also can be used to reduce the occurrence of red-eye artifacts in images that have been captured. For example, digital processing techniques also exist to remove red-eye artifacts from images in post-capture processing.

Further, images can depict visual information using various color models. A color model can describe how colors are represented, e.g., using one to four values, each corresponding to a color component. For example, in a red-green-blue (RGB) color model, a color can be described using three values—one each for red, green, and blue. Thus, three values can be used to describe the color of each pixel in an RGB image. When an intended interpretation of a color model's components is known, the set of possible colors can be referred to as a color space. For example, the three values associated with an RGB color can be mixed additively to produce a specific color in an RGB color space.

SUMMARY

This disclosure describes technologies and techniques for recognizing and reducing the occurrence of red-eye artifacts (or "red-eye") in images. Eyes play an important role in face recognition by humans. The human brain extracts information for face recognition principally from the eyes. Although details of other features, such as the mouth and nose can be important, even when very little image information is provided, if the information includes details of the eyes, humans are more likely to be able to recognize the face. Given the importance of eyes in human visual processing, image defects, such as red-eye artifacts, affecting the depiction of human eyes are especially undesirable.

Recognizing red-eye can involve detecting the existence of a red-eye artifact in an image and distinguishing the red-eye artifact from other parts of the image. Distinguishing the red-eye artifact from other parts of the image can be challenging for automated processes because skin pixels in a photograph often exhibit a red coloration for similar reasons the red-eye artifact appears red—the coloration of human tissue by the pigment melanin. Further, brown eyes can exhibit red-colored tones in the absence of a red-eye artifact.

Reducing red-eye can include altering an image so that an eye depicted in the image, which includes one or more red-eye artifacts, is altered to have a natural appearance. A facial detection process can provide information that can be used to improve the accuracy of both red-eye recognition and reduction. For example, the facial detection information can be used to estimate a location and diameter of a probable correction region. Furthermore, the facial detection information can enable a red-eye reduction process to ascertain colors associated with skin in a particular image, which can assist the red-eye reduction process in distinguishing between a red-eye artifact and skin and eyelashes. Third, the facial detection information can be used to locate the sclera, or eye white. A red-eye reduction process can assess the illuminant color of an image by using the typically neutral colored sclera as a chromatic reference point, enabling the red-eye reduction process to estimate the likely color of the fundus and the red-eye artifact.

The present inventors recognized a need to accurately recognize and reduce the occurrence of red-eye in images. Specular reflection, or "glint," which is the reflected, often white, light visible in images of eyes relative to the iris or pupil, gives the eye a natural and lifelike appearance. A need to remove red-eye artifacts without removing specular reflection also was recognized. In addition, a need was recognized to make eyes appear natural after red-eye artifact removal. A need also was recognized to substantially eliminate the occurrence of red-eye in an image without making pupils look disproportionately large, relative to the eye and face, without leaving red-fringes around the pupil, and without making the transition between the pupil and the surrounding iris look noticeably abrupt.

In general, one aspect of the subject matter described in this specification can be implemented in a computer-implemented method for detecting a red-eye artifact that includes receiving an image depicting a first eye and a second eye corresponding to a human face, and coordinates corresponding to a location of the first eye and the second eye in the image; calculating a distance between the first eye and the second eye using the received coordinates; obtaining a skin tone sample from the image based on the calculated distance and the received coordinates; generating a skin tone color region in a color space based on the obtained skin tone sample; classifying a pixel corresponding to the first eye as a red-eye pixel by comparing the pixel with the generated skin tone color region and a predetermined red-eye color region; and storing an indication of the classifying relative to the pixel. Other implementations of this and other aspects include corresponding systems, apparatuses, and computer program products.

These and other implementations can optionally include one or more of the following features. Obtaining the skin tone samples based on the calculated distance and the received coordinates can include obtaining the skin tone samples from a rectangular region above and below the first eye, relative to the face, the rectangular region having a size based on the calculated approximate distance. The color space can include a normalized red-green color space. Classifying the pixel by comparing further can include converting the pixel to the red-green color space; and determining a spatial average distance, in the red-green color space, between the converted pixel, and the generated skin tone color region and the predetermined red-eye color region.

Classifying further can include analyzing a circular correction region, having a diameter based on the distance, centered on the coordinates of the first eye. Analyzing further can include identifying red-eye pixels by comparing pixels in the circular correction region to the generated skin tone color region and the predetermined red-eye color region; ascertaining a center of mass of the identified red-eye pixels; and determining an approximate iris region by comparing the pixels in the circular correction region at increasing distances from the center of mass to the generated skin tone color region and an eye-white color region. The computer-implemented method further can include modifying the red-eye pixel based on the stored indication. Modifying further can include reducing a red color component of the red-eye pixel to substantially an average of a green color component and a blue color component of the red-eye pixel.

The techniques described in this specification can be implemented to realize one or more of the following advantages. In general, the occurrence of red-eye can be reduced in an image in accordance with one or more facial characteristics. Red-eye artifacts can be removed from an image while preserving and enhancing the natural appearance of eyes, such as by maintaining specular reflections, preserving the proper scale of the pupil to the iris and the iris to the eye, and providing a gradual transition between the pupil and the surrounding iris. In addition, red-eye artifacts can be reduced in one portion of an image and other portions of the image can be left unchanged. Further, red-eye can be recognized and reduced without requiring input from a user regarding the location of eyes in an image, and without manual manipulation of an image. Additionally, the occurrence of red-eye can be reduced such that unnatural-looking red fringes around the pupils are avoided.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Red-eye reduction using facial detection can include detecting the existence of red-eye artifacts in an image and subsequently reducing the occurrence of the red-eye artifacts. A red-eye artifact is a group of image pixels depicting an iris and/or pupil that appear inappropriately red or orange relative to the actual appearance of the iris and/or pupil (e.g., in person). Reducing red-eye refers to modifying one or more pixels of the group of pixels to reduce the red or orange tint, to make the image more accurately reflect the actual appearance of the eye.

Red-eye reduction can include processing an image in conjunction with one or more characteristics generated through a facial detection operation. Facial detection can include detecting a face in an image and the approximate location of one or more facial features within a detected face. The approximate location of facial features can be used to determine a scale for red-eye recognition and reduction processing. In specific, the scale can enable a red-eye recognition and reduction process to obtain skin samples from a portion of the face corresponding to skin. The skin samples can be used to generate a skin tone region in a color space for use in comparing pixels to determine if the pixels depict skin.

Figure 1:
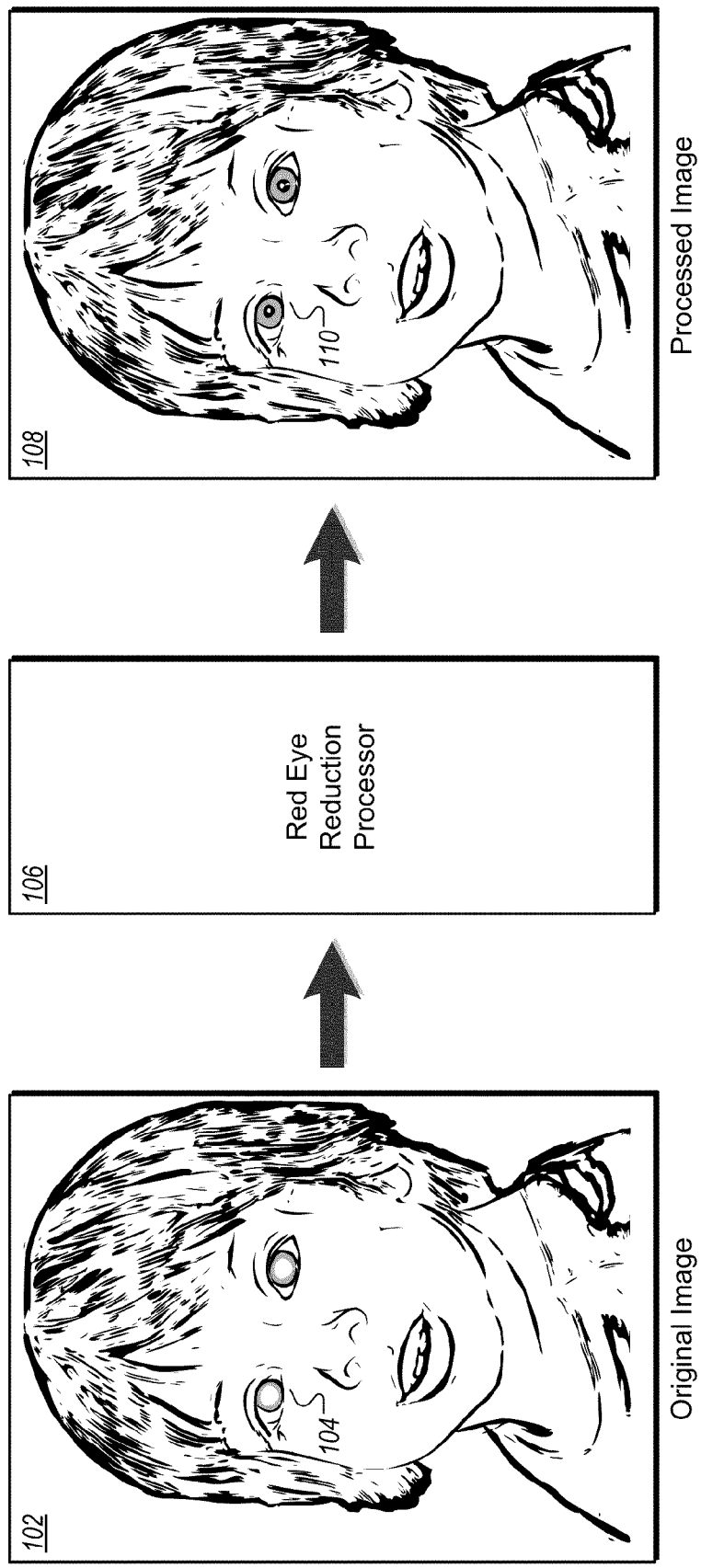
FIG. 1 shows an exemplary overview of reducing red-eye.

In general, as shown in FIG. 1, an image including one or more red-eye artifacts can be received by a red-eye reduction processor, and the red-eye reduction processor can produce a new image with reduced red-eye artifacts.

FIG. 1 shows an exemplary overview of reducing red-eye. The overview 100 includes an original image 102. The original image 102 depicts an eye 104 including a red-eye artifact.

The red-eye reduction processor 106 can receive the original image 102 and perform processing on the original image 102 to produce the processed image 108. The processed image 108 can include an eye 110 in which the red-eye artifact has been reduced. As a result of the reduction, the eye 110 can depict an iris and pupil, and maintain the specular reflection, or glint, associated with the eye. Specular reflection, or glint, refers to the appearance of a small, relative to the eye, reflection on the eye caused by ambient light reflecting off the eye due to the eye's moisture.

Figure 2:
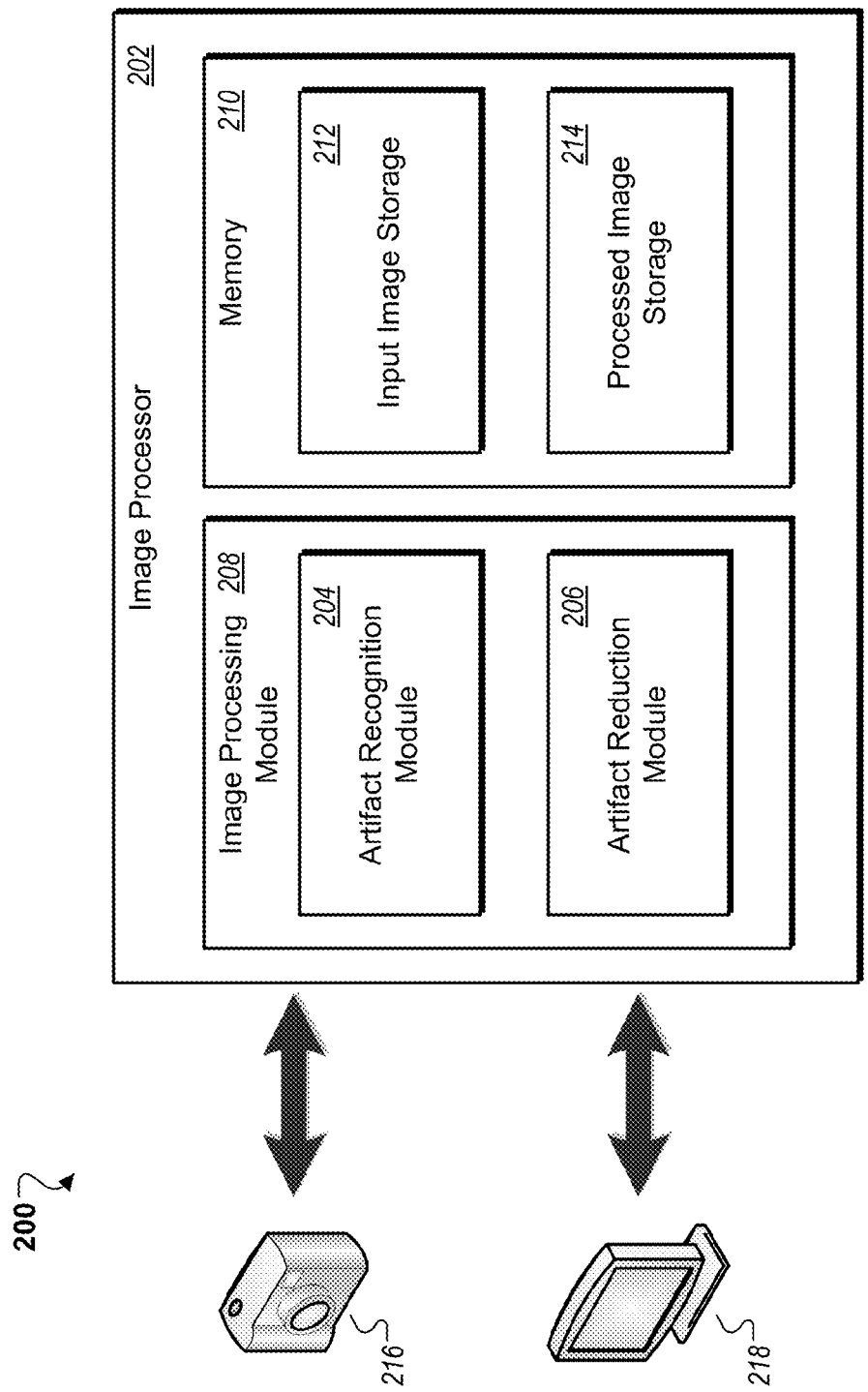
FIG. 2 shows an exemplary red-eye artifact reduction system.

In general, as shown in FIG. 2, a system can include a component that receives as input an image and generates a result indicating whether skin tone was detected in the image.

FIG. 2 shows an exemplary red-eye artifact reduction system 200. The red-eye artifact reduction system 200 corrects image defects related to red-eye artifacts. The red-eye artifact reduction system 200 can include image capture device 216, a user interface 218, and an image processor 202. The image capture device 216, such as a digital camera, can capture the image and convert the image to a digital format for the image processor 202. Alternatively, the image capture device 216 delivers an image to the image processor 202 in analog format, such as a physical photograph, to be converted to digital format by the image processor 202, such as by scanning the physical photograph.

The image processor 202 can include an image processing module 208 and a memory 210 for input image storage 212 and processed image storage 214. The image processor 202 receives the image from the image capture device 216, through a direct physical link such as an integrated circuit, cable, or network connection, an indirect physical link, such as a floppy disk or other removable memory storage device, or through a remote link, such as a wireless transmitter and receiver.

The image can contain one or more artifacts, such as a red-eye artifact caused by absorption of visible light by the retina. The artifact also can have one or more color characteristics, such as luminance, hue, or saturation. For example, a flash-induced red-eye artifact appearing in a color photograph can have an associated hue and color saturation.

The image processing module 208 can include an artifact recognition module 204 and an artifact reduction module 206. To recognize an artifact, the artifact recognition module 204 can compare at least a portion of the image to one or more reference color characteristics that are typical of artifacts of the type being detected. Such a comparison is described in greater detail relative to FIG. 5. To aid the recognition of artifacts of a given type in an image, a reference color having color characteristics that are typical of artifacts of the given type is predefined, selected, or computed. To correct the artifact, the image processing module 208 modifies at least one of the color characteristics of the artifact to obtain a more desirable appearance For example, once a pixel associated with an artifact is recognized, the red color component of the pixel can be reduced to the level of the green and blue color components.

The red-eye artifact reduction system 200 can be incorporated into a single package, such as a digital camera, or in a combination of different devices, such as an image capture device and a separate software package on a computer for performing the digital image processing. Other variations of this design apparent to one of ordinary skill in the art could be made without departing from the essence of the disclosed techniques. For example, the image processor can be configured to operate automatically without any input from a user interface 218.

Figure 3:
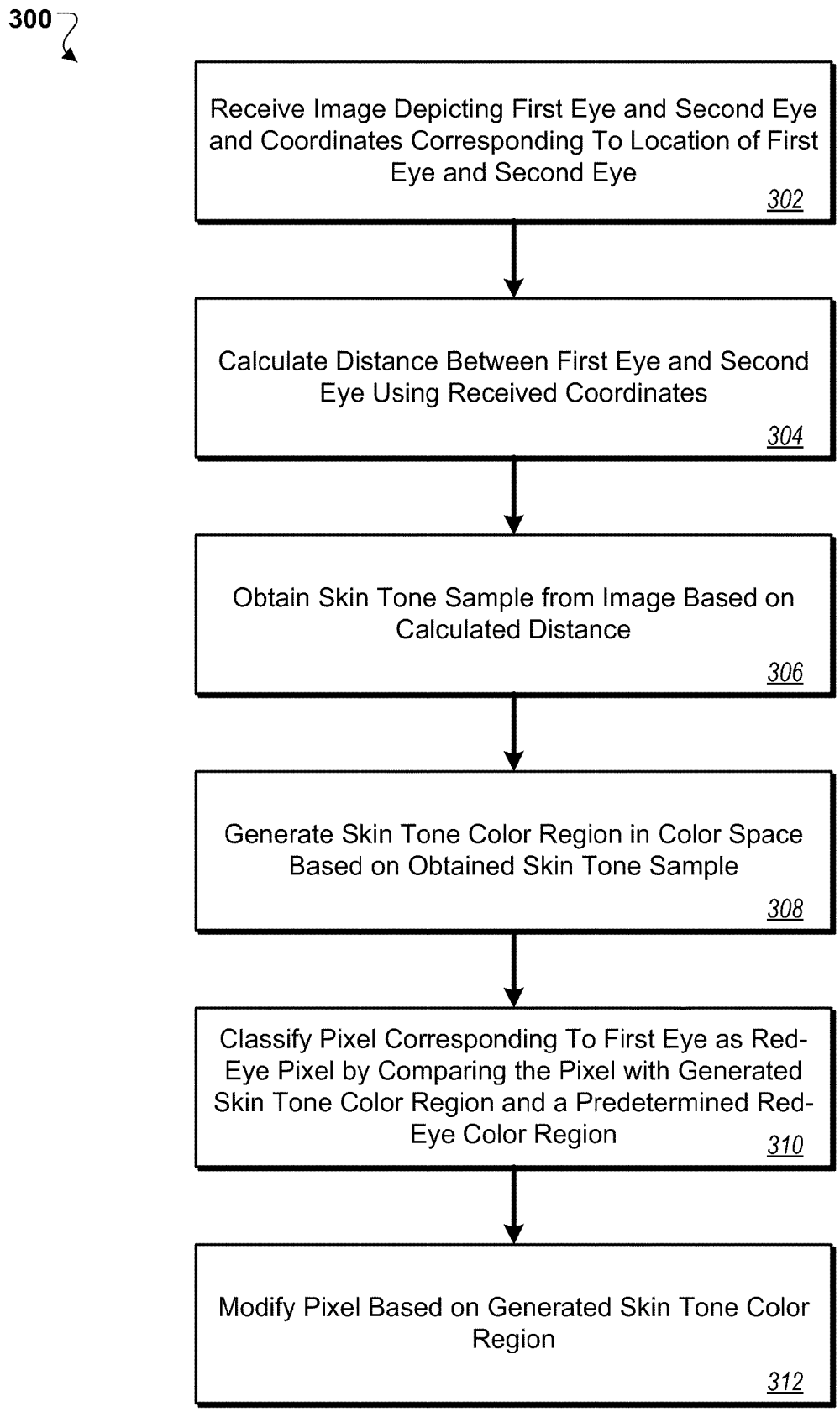
FIG. 3 shows an exemplary process for reducing red-eye artifacts.

In general, as shown in FIG. 3, a red-eye reduction process can be performed to recognize a portion of an image that includes one or more red-eye artifacts and to reduce the occurrence of the red-eye artifact. In some implementations and for some images, red-eye artifacts can be eliminated. In other implementations and for other images, either or both of the size and the magnitude of red-eye artifacts can be reduced.

FIG. 3 shows an exemplary process 300 for reducing red-eye artifacts. A red-eye reduction processor can receive (302) an image depicting a first eye and a second eye. Coordinates corresponding to the first eye and the second eye also can be received. Alternatively, the red-eye reduction processor can receive (302) an image that depicts an eye, and coordinates of the eye and other facial features, such as the corners of a rectangle bounding the associated face. The coordinates of these other facial features and the eye can be used in the exemplary process 300 instead of or in addition to the coordinates of the first eye and the second eye.

The red-eye reduction processor can receive (302) the image from an image management application in some implementations. In other implementations, the red-eye reduction processor can receive (302) the image from a facial detection processor. The facial detection processor can determine the coordinates of the first and second eyes as part of the facial detection processing and analysis of patterns of facial features. The coordinates of the eyes can be provided relative to the image enabling the red-eye reduction processor to use the coordinates in red-eye reduction.

The red-eye reduction processor can calculate (304) a distance between the first and second eyes using the received coordinates. The distance can be calculated (304) using geometric equations. For example, a first eye, having (x, y) coordinates of (50,100) relative to an image, and a second eye, having (x, y) coordinates of (100,100), can be separated by a distance of 50. The calculated distance can provide an approximation of scale relative to the eyes and face for use in the red-eye reduction processes.

Further, the red-eye reduction processor can obtain (306) one or more skin tone samples from a portion of the image near the first eye based on the calculated distance and the received coordinates. Obtaining (306) skin tone samples can include calculating the width of the face from face coordinates provided with the image and determining whether the first eye is a left or right eye. The calculated distance (i.e., the distance between the eyes) can be used to measure the scale of the sampling area of the face. For example, in some implementations, the sampling area can be directly below the eye, at a distance of 40% of the distance between the eyes. In other implementations, the sampling area can be above and/or below the eye and based on a percentage of the distance. Facial accoutrements, such as sunglasses, facial hair, and hats, can be avoided through such sampling even though some accoutrements, such as sunglasses, tend not to be present with red-eye artifacts.

Based on the obtained (306) skin tone samples, the red-eye reduction processor generates (308) a skin tone color region in a color space. The skin tone region can be the range of colors, in the color space, representing the face associated with the eye. Because of the additive nature of light, the skin tone region can be a convex polygon containing colors from the samples that have been converted to the color space. The color space can be a two- or three-dimensional color space. For example, the skin tone color region can be generated in two-dimensional normalized red-green (R-G) space.

To more accurately represent the range of colors representing the face, the red-eye reduction processor can expand the skin tone color region to encompass a greater range of skin-tone colors. Since the samples include only a portion of the overall pixels corresponding to the face, a skin tone color region encompassing all colors represented in the face is likely to be larger than a skin tone color region based only on the samples. The skin tone color region can be expanded by using a dilation adjustment, including directional adjustments based on the color of the illuminant, to produce a larger convex polygon skin tone color region. For example, in normalized R-G space the color of a red-eye artifact is likely to be both more red and less green than the color of skin given the same color illuminant (i.e., in the same image). Accordingly, the red-eye reduction processor can dilate the skin tone color region in a vector direction that decreases the red component of colors as well as the green component by half as much as the red component.

In addition to generating (308) the skin tone color region, the red-eye reduction processor can generate average skin luminosity for use in comparisons with potential red-eye pixels. Skin luminosity can be used to determine whether pixels that appear red are in fact red-eye artifact pixels, or rather sclera, skin, or facial hair. The average skin luminosity can be calculated by averaging the luminosity of the skin tone samples.

The red-eye reduction processor classifies (310) a pixel corresponding to the first eye as a red-eye pixel with the generated skin tone color region and a predetermined red-eye color region. The predetermined red-eye color region also can be defined in a color space (e.g., two-dimensional R-G space). The predetermined red-eye color region can be generated empirically. For example, samples of red-eye artifacts can be taken from images known to include such artifacts. In addition, the predetermined red-eye color region can be adapted based on images processed by the red-eye reduction processor, similarly to the skin tone color region.

The red-eye reduction processor can convert the pixel to the same color space as the skin tone color region and the predetermined red-eye color region to permit comparison. A positive comparison, indicating a pixel corresponds to a red-eye artifact, can be indicated by the convert color of the pixel falling within the predetermined red-eye color region. In addition, or alternatively, a negative comparison can be indicated by the converted color of the pixel falling outside the predetermined red-eye color region, or falling within the skin tone color region.

The red-eye reduction processor can modify (312) the pixel based on the generated skin tone color region to reduce the appearance of the red-eye artifact. The red component of the pixel can be reduced. In some implementations, the green component of pixels having an orange tint also can be reduced. Where the red component alone is reduced, the red component can be reduced to approximately the average of the levels of the green and blue components. Where the relative levels of red and green components indicate an orange tint (e.g., the green component being within 40-80% of the red component), both the red and green components can be reduced to the level of the blue component.

Modification of the overall eye can include scanning an initial analysis region, e.g., defined as a circular region using the eye coordinates and the calculated distance. Through the scanning, a correction region can be generated, e.g., corresponding only to pixels contained within the bounds of an iris. Red-eye pixels can be identified within the correction region. The red-eye pixels can be identified by comparing, using a spatial averaging scheme, the pixels within the correction region to the skin tone luminosity, predetermined red-eye color region, and skin tone color region.

If very few red-eye pixels are found, the red-eye reduction process can expand the predetermined red-eye color region in the color space to encompass more reddish colors in the comparisons. The process can analyze the correction region again using the expanded red-eye color region.

Once pixels are identified as red-eye pixels, the size of a refined correction region can be estimated based on a center of mass of the red-eye pixels and a distance from the center of mass to the perimeter of the red-eye pixels. In some implementations, the correction region can be approximated using a circle. The size of the circle can be estimated based on the number of red-eye pixels found, by calculating a radius using the circumference equation, $\pi r^2$. In other implementations, the correction region can be approximated using an ellipse or polygon.

Figure 4A:
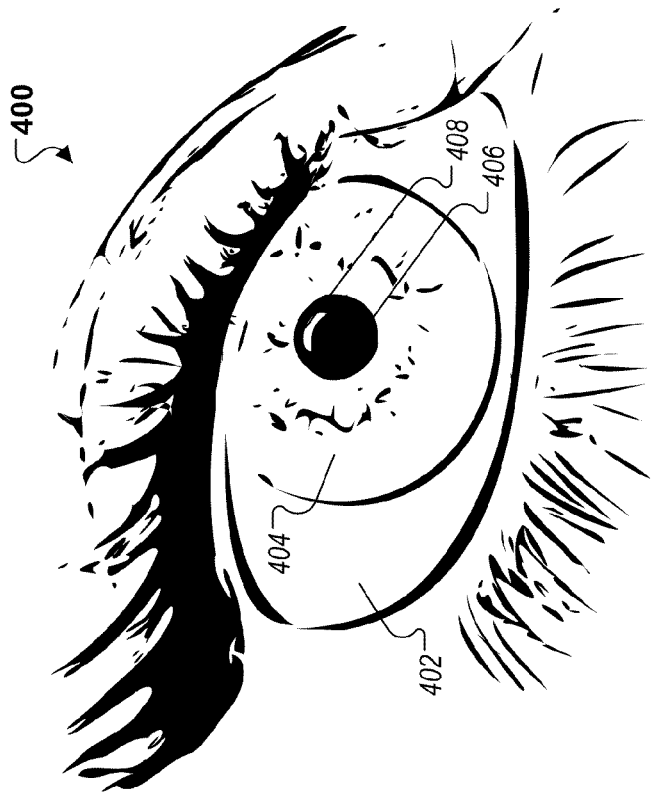
FIG. 4A shows a diagram of an eye.
Figure 4B:
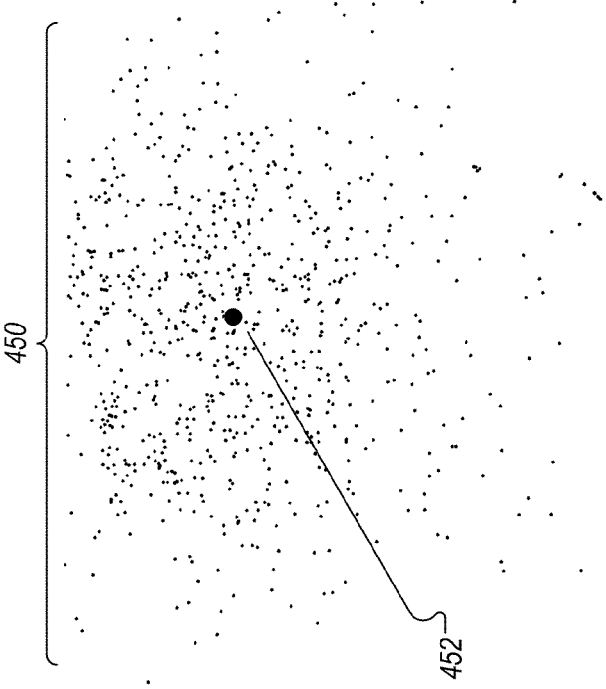
FIG. 4B shows an exemplary center of mass of red-eye pixels.

Once red-eye pixels are found, the center of the area including red-eye pixels can be determined using a center of mass operation, as described with relation to FIG. 4B. By comparing pixels at an increasing radial distance from the center of mass of the red-eye pixels to eye-white and skin-tone color regions, the red-eye reduction processor can determine an approximate iris diameter. Once the diameter is calculated, the diameter can be checked against the approximate distance between the eyes or the approximate face size to determine if the calculated diameter is plausibly correct. If the diameter is implausible based on the other information, the red-eye reduction processor can refine the calculations and/or color regions and recalculate. Otherwise, the red-eye reduction processor can proceed to reduce the occurrence of red-eye artifacts.

In some implementations, as an additional step in the modification of the red-eye pixels of the image, the red-eye reduction processor can blend and diffuse the eye to ensure changes are not too abrupt and look natural. The red-eye reduction processor can determine which red-eye pixels are periphery pixels by calculating which red-eye pixels are the furthest from the center of the correction region. The periphery pixels can be blended by modifying the red, green and blue components of the periphery pixels based on adjacent pixels. The blending can smooth the appearance of the corrected pixels and reduce any visible edge of the correction region.

FIG. 4A shows a diagram of an eye 400. The eye 400 includes a sclera 402, an iris 404, and a pupil 406. For eyes to appear natural, each of the sclera 402, iris 404, and pupil 406 should be depicted clearly and proportionately.

The sclera 402, also known as the white of the eye, is the opaque, whitish, protective outer layer of the eye. In children, the sclera 402 can be thinner than in adults and some of the underlying pigment can show through the sclera 402. As a result, the sclera 402 can include a blue tint. In the elderly, fatty deposits can cause the sclera 402 to include a yellow tint.

The iris 404 is a membrane in the eye, responsible for controlling the amount of light reaching the retina. The iris 404 consists of pigmented fibrovascular tissue known as a stroma. Because the iris 404 is unable to respond sufficiently quickly to a flash of bright light, such as that used in flash photography, much of the bright light passes into the eye through the pupil 406. The light reflects off of the fundus at the back of the eyeball and passes back out through the pupil 406. The reflected light can have a red or orange hue because of blood located in the choroid, the vascular layer of the eye. A camera can record the reflected light and a subject's eyes can appear red in the resulting image.

An additional challenge in reducing red-eye in images is the glint 408, or small, bright spectral reflection that often appears in conjunction with the iris 404 and/or pupil 406 in an image. The glint 408 results from reflection of light off the surface of the eye rather than reflection off the fundus as with red-eye artifacts. Eliminating the glint 408 during red-eye reduction can cause an eye 400 to appear unnatural or lifeless. As with red-eye artifacts, the glint 408 can be bright, relative to the image. Pixels associated with glint typically can be whiter in color and brighter (i.e. having a greater luminosity) than red-eye artifact pixels. However, image compression (e.g., compression in accordance with the Joint Photographic Experts Group (JPEG) standard) can cause color bleeding, making glint appear pink when the glint occurs in conjunction with red-eye artifacts. A red-eye reduction process can identify these pixels by identifying pixels that are brighter and whiter than surrounding pixels, and that form a small group not at the periphery of the pupil.

In operation, a red-eye reduction process can use the center of mass of pixels exhibiting red-eye characteristics, as described below with respect to FIG. 4B, in determining an approximate center of the pupil 406 and iris 404. Given the approximate center as a starting point, a red-eye reduction process can examine pixels at increasing radial distances from the approximate center until pixels exhibiting characteristics of the sclera 402 or skin are detected. When the red-eye reduction process detects pixels exhibiting characteristics of the sclera 402 or skin, the process can calculate an approximate diameter of the iris 404. The red-eye reduction process can use the calculated diameter as a limitation for red-eye reduction processing. Avoiding erroneously modifying pixels depicting reddish skin tones can permit skin to retain a natural appearance and avoid the blotching caused by applying red-eye reduction techniques to skin.

FIG. 4B shows an exemplary center of mass of red-eye pixels. A red-eye reduction process can determine whether pixels correspond to colors associated with red-eye artifacts. When a pixel value corresponds to a red-eye color value, the red-eye reduction process can designate the pixel as a red-eye pixel. Further, the red-eye reduction process can ascertain a center of mass for a grouping of red-eye pixels. The center of mass of the designated red-eye pixels can be used as part of defining an iris region.

The center of mass 452 for a group of red-eye pixels 450 can be described as the sum over all locations of light intensity at a location multiplied by the relative location. Thus, the center of mass 452 can be a weighted average of brightness, according to location. The center of mass 452 can be identified for the group of pixels 450, by calculating a row center of mass for each row of the group of pixels 450 as well as the total brightness or intensity for each row. The results for the rows can be superposed and a horizontal center of mass can be calculated for that superposed value. The horizontal center of mass can be the center of mass for the groups of pixels 450 as a whole in the horizontal direction. Similarly, a vertical center of mass of the row intensities can be calculated. The vertical center of mass can be the center of mass for the group of pixels 450 as a whole in the vertical direction. The horizontal center of mass and the vertical center of mass indicate the center of mass for the group of pixels 450 as a whole.

Figure 5:
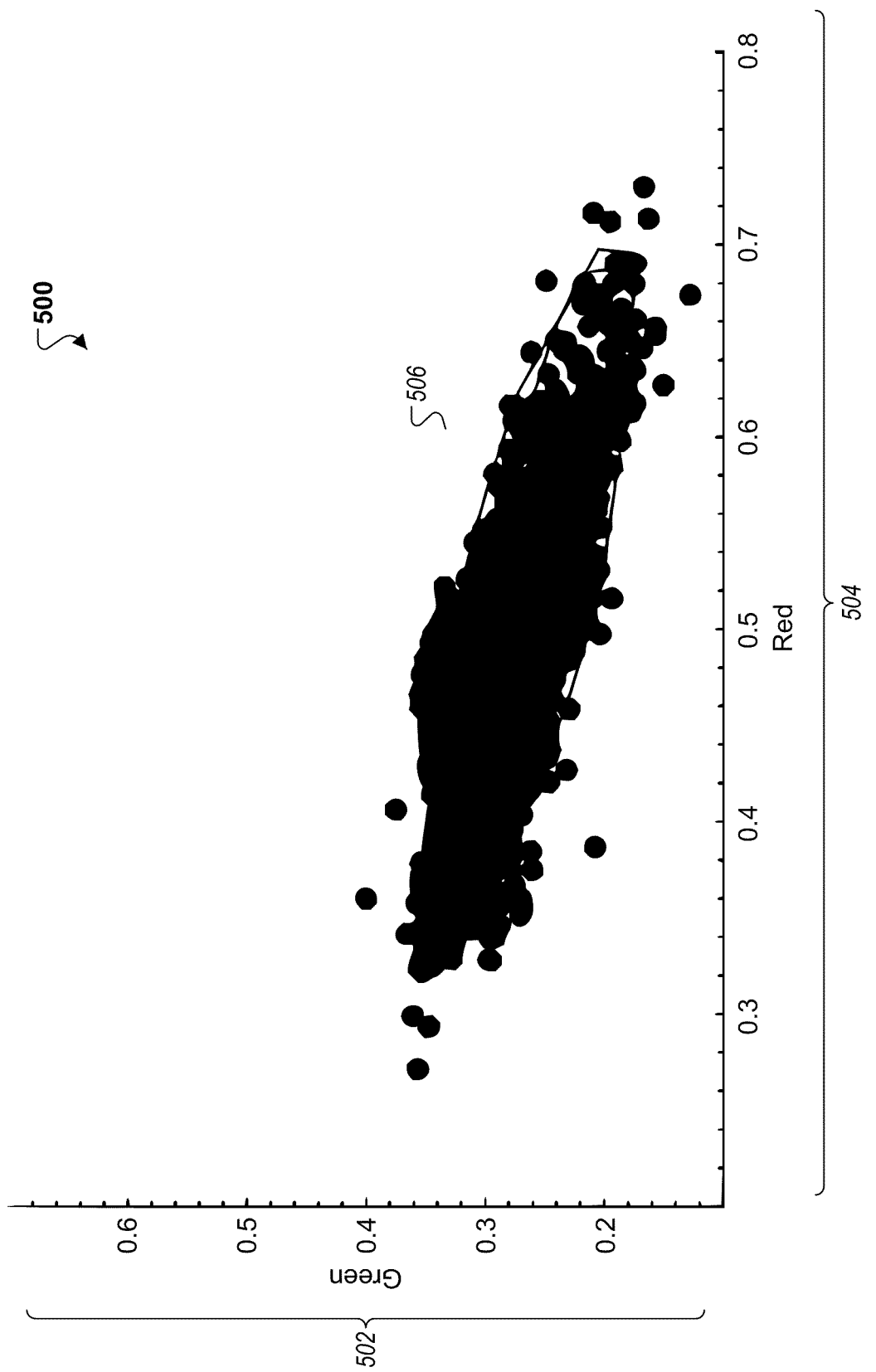
FIG. 5 shows a diagram of an exemplary color region of a color space.

In general, as shown in FIG. 5, a convex polygonal region in a color space can be delineated to represent particular characteristics. For example, color regions corresponding to skin tone, red-eye and eye-white colors can be defined. A red-eye reduction processor can compare pixels to the regions to assess whether a pixel has a particular characteristic (e.g., representing skin). A red-eye reduction processor can evaluate whether the colors of pixels from an image (e.g., pixels in a sample portion of an image) represent skin tone by ascertaining whether the pixel colors are inside or outside the polygonal region.

The red-eye reduction processor can evaluate whether a pixel corresponds to various color characteristics by converting the pixel from an original color space to a test color space. Converting can improve the accuracy of and decrease the computer resources needed for the evaluation. Converting a pixel color to multiple test color spaces also can allow comparison between and combination of test results using the multiple test color spaces. For example, a pixel color can be converted to a first test color space adapted to improve the accuracy of positive skin tone detection but in which false positive skin tone detection also can occur. Testing the pixel color in a second test color space can corroborate the test result in the first test color space, or indicate a likelihood of results in the first test color space representing falsely positive skin tone detection.

Furthermore, the red-eye reduction processor can convert the selected pixel (506) from a three-dimensional (e.g., RGB) or four-dimensional (e.g., RGB with transparency, or cyan, magenta, yellow, and key (CMYK)) original color space to a one-, two-, or three-dimensional test color space. For example, a two-dimensional test color space, such as red-green (R-G) or red-blue (R-B), can provide accurate and efficient skin tone detection.

Pixels can be converted from an original color space to a test color space using a variety of techniques. For example, to convert from a four-dimensional color space to a three-dimensional color space, one pixel component, such as transparency, can be ignored. Alternatively, a transparency component can be equated with white and mixed with the other color components to convert from a four-dimensional color space to a three-dimensional color space.

To convert from a three-dimensional color space to a two-dimensional color space, a variety of techniques also can be used. In some implementations, one of the three components can be ignored. In other implementations, a pixel in a three-dimensional color space (e.g., RGB) can be converted to a different three-dimensional color space (e.g., HSL space) and one of the three components (e.g., lightness) can then be ignored. In still other implementations, the red-eye reduction processor can divide one color component of a pixel by the pixel's luminosity.

Luminosity can be calculated in various ways. Where R represents a red component of a pixel color, G represents a green component, and B represents a blue component, the luminosity (L) can be calculated using the formula:

$$L = (0.299 \times R) + (0.587 \times G) + (0.144 \times B).$$

Alternatively, luminosity can be calculated using the formula:

$$L = \frac{1}{3} \times (R + G + B).$$

In other implementations, assuming a max operation selects the largest value from a list of values and a min operation selects the smallest value from a list of values, luminosity can be calculated using the formula:

$$L = \frac{1}{2} \times (\max(R, G, B) + \min(R, G, B)).$$

In two-dimensional color space, each pixel can have two components. For example, pixels in R-G color space (or R-G space) can have a red and a green component, or in R-B color space, a red and a blue component. If a pixel is converted (506) to an R-G color space, the pixel's red component ($R_{new}$) can be calculated using the formula:

$$R_{new} = \frac{R}{L}.$$

The pixel's green component ($G_{new}$) can be calculated using the formula:

$$G_{new} = \frac{G}{L}.$$

Depending on the luminosity formula used, the new red and green components can be normalized such that the range of possible values for each component is 0.0-1.0. Where the luminosity is zero, neutral values can be assigned.

FIG. 5 shows a diagram 500 of an exemplary color region 506 of a color space. The diagram 500 can include a two-dimensional, normalized R-G color space coordinate system representation. A point on the coordinate system can represent a color in the color space. A red and a green component of the color can be represented by the location of the point. In specific, a horizontal axis 504 can correspond to a red component of a color. The distance of a point, from left to right, can indicate the intensity of the color's red component. A point near the vertical axis can have a red component of lower intensity than a point further from the vertical axis. The vertical axis 502 can correspond to a green component of a color. The distance of a point, from bottom to top, relative to the vertical axis 502 can indicate the intensity of a color's green component. The potential values of the red and green components can be normalized such that the lowest possible intensity can be indicated by 0.0 and the highest possible intensity can be indicated by 1.0. For example, a pixel can have a green component of 0.2 and a red component of 0.7 in the normalized R-G space. A point representing the color of the pixel can be located in the lower-right portion of the diagram 500. Within the normalized R-G space, typically, the sum of the red and green components cannot exceed 1.0.

The color region 506 can be delineated using a polygonal region in R-G space. The size and shape of the color region 506 can be established empirically. For example, images including skin, eye-white or red-eye depictions can be analyzed. The colors of corresponding pixels can be stored. The stored results can be used to generate the color region 506.

In some implementations, multiple color regions, such as the color region 506, can be used in combination or separately to delineate characteristic colors.

Implementations of the subject matter and functional operations described in this specification can be implemented in electronic circuitry, computer software, firmware, or hardware, or in combinations or equivalents thereof. The subject matter can be implemented as one or more computer program products, such as one or more computer programs tangibly embodied in a device or medium, including a machine-readable storage device, or a machine-readable storage medium. Machine-readable includes optically readable, such as involving optically readable physical marks made on a substrate that are readable with the aid of light. Machine-readable also includes magnetically interpretable storage or recording involving physical patterns made in a magnetizable material. Computer program products can be used for execution by, or to control the operation of data processing apparatus, including one or more processors, or computers. The data processing apparatus can include any of hardware, processor firmware, a protocol stack, a database management system, and an operating system.

A computer program (also known as a program, software, software application, or code) can be written a programming language, including compiled or interpreted languages, and deployed in various forms, including as a stand-alone program or as a module, component, subroutine, or other unit suitable for use in a computing environment. A computer program does not necessarily correspond to a file. A computer program can be stored in a portion of a file that holds other programs or data, in a single file dedicated to the program in question, or in multiple coordinated files (e.g., files that store one or more modules, sub-programs, or portions of code). A computer program can be executed on one computer or on multiple computers at one site or distributed across multiple sites and interconnected by a communication network, such as a network or internetwork of networks (e.g., the Internet).

The processes and logic flows described in this specification can be performed by computer program products operating on input data and generating output. Processors suitable for the execution of a computer program product include general and special purpose microprocessors, and one or more computer processors. A processor can receive, retrieve and execute instructions and data from read-only memory, random access memory or both.

A computer can include a processor for executing instructions and one or more memory devices for storing instructions and data. A computer also can include, or be operatively coupled to receive data from or transfer data to, or both, one or more mass storage devices for storing data, e.g., magnetic, magneto-optical disks, or optical disks. A computer can be embedded in another device, such as a mobile telephone, a digital camera, a digital scanner, a digital video recorder, a personal digital assistant (PDA), a mobile audio player, or a Global Positioning System (GPS) receiver. Machine-readable storage devices or storage media suitable for embodying computer program instructions and data can include non-volatile memory, such as semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

User interaction can be implemented on a computer or other device having a display device, e.g., a CRT (cathode ray tube) or LCD (liquid crystal display) monitor, for displaying information to the user, and any form of input device, e.g., keyboard and a pointing device, e.g., a mouse or a trackball, by use of which the user can provide input. Other kinds of devices can be used to provide for interaction with a user as well; for example, feedback provided to the user can be any form of sensory feedback, e.g., visual feedback, auditory feedback, or haptic feedback; and input from the user can be received in any form, including acoustic, speech, or haptic input.

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method for detecting a red-eye artifact,
   the method comprising:
   receiving an image depicting a first eye and a second eye corresponding to a human face, and coordinates corresponding to a location of the first eye and the second eye in the image;
   calculating a distance between the first eye and the second eye using the received coordinates;
   obtaining a skin tone sample from the image based on the calculated distance and the received coordinates;
   generating a skin tone color region in a color space based on the obtained skin tone sample;
   classifying a pixel corresponding to the first eye as a red-eye pixel by comparing the pixel with the generated skin tone color region and a predetermined red-eye color region and by analyzing a circular correction region having a diameter based calculated distance and centered on the coordinates corresponding to the location of the first eye, wherein the act of analyzing further comprises:
     identifying red-eye pixels by comparing pixels in the circular correction region to the generated skin tone color region and the predetermined red-eye color region;
     ascertaining a center of mass of the identified red-eye pixels; and
     determining an approximate iris region by comparing the pixels in the circular correction region at increasing distances from the center of mass to the generated skin tone color region and an eye-white color region; and
   storing an indication of the classifying relative to the pixel.

2. The computer-implemented method of claim 1, wherein obtaining the skin tone sample based on the calculated distance and the received coordinates comprises obtaining the skin tone sample from a rectangular region above and below the first eye, relative to the face, the rectangular region having a size based on the calculated approximate distance.

3. The computer-implemented method of claim 1, wherein the color space comprises a normalized red-green color space.

4. The computer-implemented method of claim 3, wherein classifying the pixel by comparing further comprises:
   converting the pixel to the red-green color space; and
   determining a spatial average distance, in the red-green color space, between the converted pixel, and the generated skin tone color region and the predetermined red-eye color region.

5. The computer-implemented method of claim 1, further comprising:
   modifying the red-eye pixel based on the stored indication.

6. The computer-implemented method of claim 5, wherein modifying further comprises:
reducing a red color component of the red-eye pixel to substantially an average of a green color component and a blue color component of the red-eye pixel.

7. A computer program product, tangibly encoded on a non-transitory computer-readable medium, operable to cause data processing apparatus to perform operations comprising to
receive an image depicting a first eye and a second eye corresponding to a human face, and coordinates corresponding to a location of the first eye and the second eye in the image,
calculate a distance between the first eye and the second eye using the received coordinates,
obtain a skin tone sample from the image based on the calculated distance and the received coordinates,
generate a skin tone color region in a color space based on the obtained skin tone sample,
identify a red-eye pixel from the image associated with the first eye,
modify the red-eye pixel based on the generated skin tone color region, wherein the operation to modify further comprises operation to:
identify red-eye pixels from the image associated with the first eye, and
ascertain a region of the image to modify based on a center of mass of the red-eye pixels and an evaluation, using the generated skin tone color region and an eye-white color region, of pixels from the image at increasing distances from the center of mass, and
store the image including the modified first eye.

8. The computer program product of claim 7, wherein to obtain the skin tone sample based on the calculated distance and the received coordinates comprises to
obtain the skin tone sample from a rectangular region centered on the approximate coordinates of the first eye, and as wide as the calculated approximate distance, and as tall as twice the calculated approximate distance.

9. The computer program product of claim 7, wherein the color space comprises a normalized red-green color space.

10. The computer program product of claim 7, wherein to identify comprises to identify the red-eye pixel by comparing the pixel to the generated skin tone color region and a predetermined red-eye color region.

11. The computer program product of claim 10, wherein to identify further comprises to
convert the pixel to the color space, and
determine a spatial average distance, in the color space, between the converted pixel, and the generated skin tone color region and the predetermined red-eye color region.

12. The computer program product of claim 7, wherein to modify the red-eye pixel further comprises to
alter a red color component of the red-eye pixel.

13. The computer program product of claim 7, wherein to modify the red-eye pixel further comprises to
alter a red color component of the red-eye pixel to substantially an average of a green color component and a blue color component of the red-eye pixel, and
blend the altered iris pixels based on neighboring pixels of the red-eye pixel.

14. A system for reducing the occurrence of red-eye artifacts comprising:
a storage device operable to store software instructions;
a processor operable to interact with the storage device, to retrieve and execute software instructions embodying operations comprising:
receiving an image depicting a first eye and a second eye corresponding to a human face, and coordinates of the first eye and the second eye in the image;
calculating a distance between the first eye and the second eye using the received coordinates;
obtaining a skin tone sample from a rectangular region above and below the first eye, relative to the face, the rectangular region having a size based on the calculated distance;
generating a skin tone color region in a color space based on the obtained skin tone sample;
deriving a classification of a pixel corresponding to the first eye based on the generated skin tone color region and a predetermined red-eye color region, wherein the operation of deriving a classification comprises:
identifying red-eye pixels corresponding to the first eye by comparing pixels in the rectangular region with the generated skin tone color region and the predetermined red-eye color region;
ascertaining a center of mass of the red-eye pixels;
determining an iris region for the first eye by evaluating pixels corresponding to the first eye at increasing distances from the center of mass based on the generated skin tone color region and an eye-white color region;
modifying the pixel based on the derived classification; and
storing the modified first eye using the storage device.

15. The system of claim 14, wherein the color space comprises a normalized red-green color space.

16. The system of claim 15, wherein the operation of deriving the classification further comprises:
converting the pixel to the red-green color space; and
determining a spatial average distance, in the red-green color space, between the converted pixel, and the generated skin tone color region and the predetermined red-eye color region.

17. The system of claim 14, wherein the operations further comprise:
adjusting the red-eye pixels from the iris region; and
blending the adjusted red-eye pixels based on neighboring pixels of the adjusted red-eye pixels.

* * * * *

UNITED STATES PATENT AND TRADEMARK OFFICE
CERTIFICATE OF CORRECTION

| | |
|---|---|
| PATENT NO. | : 8,559,668 B2 |
| APPLICATION NO. | : 12/476192 |
| DATED | : October 15, 2013 |
| INVENTOR(S) | : Russell Reid et al. |

It is certified that error appears in the above-identified patent and that said Letters Patent is hereby corrected as shown below:

In the Claims

Column 12, line 33, Claim 1, line 18, insert "on the" prior to "calculated".

Signed and Sealed this
Twenty-sixth Day of November, 2013

Margaret A. Focarino
*Commissioner for Patents of the United States Patent and Trademark Office*